United States Patent Office 2,838,496
Patented June 10, 1958

2,838,496
6-FLUORO STEROIDS AND PROCESS FOR PREPARING SAME

John C. Babcock, Portage Township, Kalamazoo County, and J Allan Campbell and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,452

18 Claims. (Cl. 260—239.55)

The present invention relates to steroid compounds and is more particularly concerned with 6-fluoro-17α-hydroxyprogesterone and 17-acylates thereof, particularly with 6α-fluoro-17α-hydroxyprogesterone 17-acylates and intermediates therefor; 6α-fluoro-17α-hydroxyprogesterone, and a process of production thereof.

The new compounds and the process of the present invention are illustratively represented by the following formulae:

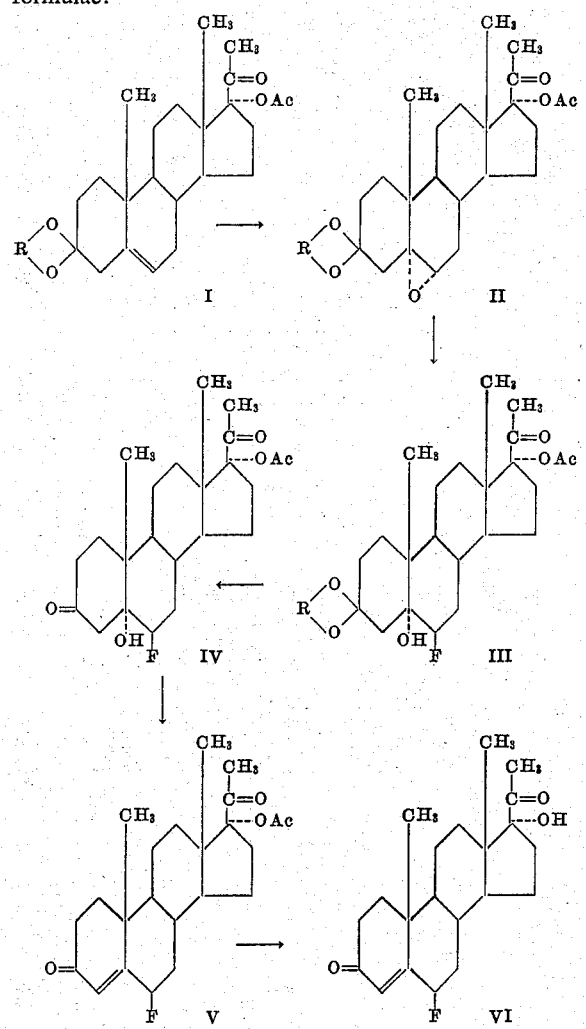

wherein R is an alkylene radical containing not more than eight carbon atoms, inclusive, and the attaching oxygen to carbon bonds are separated by a chain of at least two and not more than three carbon atoms, and Ac is the acyl radical of an organic carboxylic acid and preferably of a hydrocarbon carboxylic acid containing from one to twelve carbon atoms, inclusive.

The process of the present invention comprises: treating a 17α-hydroxyprogesterone 17-acylate, 3-alkylene ketal (I), with a peracid, such as performic, peracetic, and perbenzoic to obtain 5α,6α-oxido-17α-hydroxypregnane-3,20-dione 17-acylate, 3-alkylene ketal (II); treating the thus obtained 5α,6α-oxido-17α-hydroxypregnane-3,20-dione 17-acylate, 3-alkylene ketal (II) with hydrogen fluoride to give the corresponding 5α17α-dihydroxy-6β-fluoropregnane-3,20-dione 17-acylate, 3-alkylene ketal (III); hydrolyzing with aqueous acid in a suitable solvent the thus obtained ketal (III) to yield 5α,17α-dihydroxy-6β-fluoropregnane-3,20-dione 17-acylate (IV), and dehydrating the thus obtained 5α,17α-dihydroxy-6β-fluoropregnane-3,20-dione (IV) 17-acylate with a base or, preferably, with an acid to obtain 6-fluoro-17α-hydroxy-4-pregnene-3,20-dione 17-acylate (6-fluoro-17α-hydroxyprogesterone 17-acylate) (V).

Higher concentrations of acid produces the 6α-epimer of V, while lower concentrations of acid produce the 6β-isomer. The 6β-fluoro-17α-hydroxyprogesterone 17-acylate can also be converted to 6α-fluoro-17α-hydroxyprogesterone 17-acylate by enolizing agents such as strong mineral acids e. g., sulfuric, perchloric, hydrochloric, nitric (dilute), or the like. If a base is used such as aqueous sodium or potassium hydroxide, low concentration and temperature gives 6β-fluoro-17α-hydroxyprogesterone 17-acylate, while high concentration gives the 6α-epimer free alcohol, i. e. 6α-fluoro-17α-hydroxyprogesterone.

Saponification of 6-fluoro-17α-hydroxyprogesterone 17-acylate (V) to obtain the 6-fluoro-17α-hydroxyprogesterone (VI) is carried out by allowing the starting material (V) to react with a base, e. g. sodium or potassium hydroxide, or for an extended period with an aqueous acid such as dilute hydrochloric acid.

Alternatively, 6-fluoro-17α-hydroxyprogesterone and 6-fluoro-17α-hydroxyprogesterone acylates are produced by the following two methods:

I

Treating 17α-hydroxypregnenolone 17-acetate with peracetic acid to obtain 3β,17α-dihydroxy-5α,6α-oxidopregnan-20-one 17-acetate, treating the thus produced 3β,17α-dihydroxy-5α,6α-oxidopregnan-20-one 17-acetate with hydrogen fluoride to obtain 3β,5α,17α-trihydroxy-6β-fluoropregnan-20-one 17-acetate; and oxidizing by an Oppenauer oxidation using aluminum isopropoxide and acetone to give 6-fluoro-17α-hydroxyprogesterone 17-acetate which can be hydrolyzed with dilute alkali and if desired reesterified by refluxing the 6-fluoro-17α-hydroxyprogesterone with an acid anhydride of a hydrocarbon carboxylic acid containing from one to twelve carbon atoms, inclusive, preferably in the presence of an acidic catalyst to obtain 6-fluoro-17α-hydroxyprogesterone-17α-acylate.

II

In the same manner as in the outline in column 1 treating 17α-hydroxyprogesterone diketal, produced by ketalizing for example with ethylene glycol in the presence of toluene-sulfonic acid under conditions as shown in preparation I 17α-hydroxyprogesterone, with a peracid such as peracetic, perbenzoic acid and the like to obtain 17α-hydroxy - 5α,6α - oxido-17α-hydroxypregnane-3,20-dione 3,20-bisethylene ketal, treating the thus obtained diketal with hydrogen fluoride to obtain 5α,17α-dihydroxy-6β-fluoropregnane-3,20-dione 3,20-diketal, hydrolyzing the thus obtained 5α,17α-dihydroxy-6β-fluoropregnane-3,20-dione 3,20-diketal with an acid to obtain 5α,17α-dihydroxy-6β-fluoropregnane-3,20-dione and treating the thus produced 5α,17α-dihydroxy-6β-fluoropregnane-3,20-dione with a dehydrating agent such as a strong base or a strong acid to give 6-fluoro-17α-hydroxyprogesterone. The 6- fluoro-17α-hydroxyprogesterone can be acylated in the manner well known for tertiary alcohols to give the corresponding 6-fluoro-17α-hydroxyprogesterone 17-acylate.

It is an object of the instant invention to provide 6-fluoro-17α-hydroxyprogesterone esters, 6-fluoro-17α-hydroxyprogesterone and intermediates for the production thereof, such as 5α,17α-dihydroxy-6β-fluoropregnane-3,20-dione and the alkylene ketals thereof, having from one to eight carbon atoms in the alkylene chain. It is another object of the instant invention to provide a process for the production of 6-fluoro-17α-hydroxyprogesterone esters (both the 6α and 6β-epimers), 6-fluoro-17α-hydroxyprogesterone, and intermediates such as 5α,17α-dihydroxy-6β-fluoropregnane-3,20-dione and 3-alkylene ketals thereof. It is a particular object of the instant invention to provide the 17-esters of 6α-fluoro-17α-hydroxyprogesterone, especially the acetate thereof and a method for the production thereof. Other objects of this invention will be apparent to those skilled in the art to which this invention pertains.

The new products, 6-fluoro-17α-hydroxyprogesterone esters, have utility as oral and parenteral progestational agents. Owing to their progesterone like effects, the esters of this invention find application in "cyclic" therapy, where estrogenic and progestational hormones are supplied together or in succession so as to favor re-establishment of normal endometrium-ovary-anterior pituitary relationships in cases of menstrual disturbances.

Tablets for oral use (50,000) are prepared from the following types and amounts of material:

6α-fluoro-17α-hydroxyprogesterone 17α-acetate___oz__ 3
Lactose, USP_____lbs__ 3

An aqueous suspension for oral use, containing in each five cc. dose two milligrams of 6α-fluoro-17α-hydroxyprogesterone 17-(β-cyclopentylpropionate), is prepared from the following types and amounts of materials:

6α-fluoro-17α-hydroxyprogesterone 17-(β-cyclopentylpropionate), micronized_____grams__ 0.4
Citric acid, USP_____do____ 2
Benzoic acid, USP_____do____ 1
Methylparaben, USP_____do____ 2
Propylparaben, USP_____do____ 0.5
Glycerine, USP_____cc___ 150
Tragacanth powder, USP_____grams__ 7.5
Essential oil flavor concentrate_____cc___ 0.2
Sucrose, USP_____grams__ 400
Deionized water to make 1000 cc.

The citric acid is dissolved in 500 cc. of water. The benzoic acid and parabens are added to the glycerine in a separate container, followed by the finely powdered 6α-fluoro-17α-hydroxyprogesterone 17-(β-cyclopentylpropionate), tragacanth and flavors in the order named. This is mixed until a uniform suspension is achieved and then added to the aqueous solution with rapid stirring. Finally, the sugar is added and the whole mixed thoroughly followed by processing through a colloid mill. Sufficient water is employed to rinse the colloid mill and the rinsings used to bring the final volume to 1000 cc. The suspension is assayed for potency and used clinically.

For parenteral use microcrystalline aqueous suspension of 17-hydroxy-6-fluoroprogesterone esters can be used.

Instead of the 6α-fluoro-17α-hydroxyprogesterone 17-acylate, the β-isomer, 6β-fluoro-17α-hydroxyprogesterone 17-acylate, can be substituted in the above-preparations in pharmaceutically equivalent amounts. Other esters of 6-fluoro-17α-hydroxyprogesterone used, include the propionate, butyrate, isobutyrate, valerate, isovalerate, hexanoate, heptanoate, octanoate, β-cyclopentylpropionate, benzoate, toluate, phenylacetate, phenylpropionate, hemisuccinate, β-dimethylglutarate, cyclohexylformate, decanoate, undecanoate, laurate, undecylenate, trimethylacetate, acrylate, crotonate, formate, phenoxyacetate, chrysanthemum-monocarboxylate and the like. The unesterified compound, 6α-fluoro-17α-hydroxyprogesterone is not only an important intermediate for the production of the above mentioned progestationally active esters, but also serves as an intermediate for the production of adrenocortically active steroids. For example fermentation of 6α-fluoro-17α-hydroxyprogesterone with *Cunninghamella blakesleeana* gives the highly adrenocortically-active, anti-inflammatory 6α-fluoro-11β,17α-dihydroxy-4-pregnene-3,20-dione. Additional step-wise fermentation of 6α-fluoro-11β,17α-dihydroxy-4-pregnene-3,20-dione with *Ophiobolus herpotrichus*, Centraalbureau voor Schimmelcultur, Baarn, Holland and then with *Septomyxa affinis*, ATCC 6737, produces the highly-active anti-inflammatory and anti-arthritic compound, 1-dehydro-6α-fluorohydrocortisone.

The starting compounds of the instant invention are 17α-hydroxyprogesterone 17-acylate 3-ketals, produced as shown in Preparations 1 through 9.

In carrying out the process of the present invention a selected 17α-hydroxyprogesterone 17-acylate, 3-alkylene ketal is dissolved in an inert organic solvent such as chloroform, methylene chloride, ethylene dichloride, carbon tetrachloride, benzene, toluene, or the like, and treated with an organic peracid such as performic, peracetic, perpropionic, perbenzoic, monoperphthalic acid or other organic peracids. The reaction is generally carried out at low temperatures such as between minus ten and plus ten degrees centigrade. However, higher or lower temperatures such as minus thirty to up to plus forty degrees centigrade are operable.

In the preferred embodiment of the invention temperatures between zero and five degrees, a chlorinated hydrocarbon such as chloroform or methylene dichloride and peracetic, perphthalic or perbenzoic acid are used. The peracid is used in a quantity usually from ten to twenty percene above the one theoretically required up to five times the one required by theory.

At the end of the reaction, the mixture is neutralized preferably with sodium or potassium carbonate or bicarbonate, washed with water and the thus produced 5α,6α-oxido-17α-hydroxypregnane-3,20-dione 17-acylate, 3-alkylene ketal recovered by evaporation of the solvents. Recrystallization from organic solvents such as methanol, ethanol, Skellysolve B hexanes, heptanes, benzene, toluene, methylene chloride, ether or the like, provides pure 5α,6α-oxido-17α-hydroxypregnane-3,20-dione 17-acylate, 3-alkylene ketal.

The thus obtained 5α,6α-oxido-17α-hydroxypregnane-3,20-dione 17-acylate, 3-alkylene ketal, dissolved in a suitable organic solvent, is reacted with hydrogen fluoride to open the epoxy bond and to give 5α,17α-dihydroxy-6-fluoropregnane-3,20-dione 17-acylate, 3-alkylene ketal. The hydrogen fluoride used can be gaseous hydrogen fluoride, hydrofluoric acid in aqueous solution available in 48 percent strength or a metal fluoride releasing hydrogen fluoride when treated by an acid as, for instance, potassium or sodium bifluoride and an acid such as acetic, propionic or mineral acids such as perchloric, sulfuric acid or the like. The reaction is ordinarily performed at between about minus seventy and plus fifty degrees centigrade. If anhydrous hydrogen fluoride is used usually low temperatures, that is, temperatures between minus seventy and plus ten degrees, are preferred. The hydrogen fluoride, for example, can be allowed to enter from a hydrogen fluoride gas cylinder into a vessel not reactive to hydrogen fluoride. If aqueous hydrogen fluoride is used the reaction can be carried out between zero degrees and room temperature. Similarly when the hydrogen fluoride is produced in situ by the reaction of a metalic fluoride such as potassium bifluoride and an acid, reaction temperatures between zero to room temperature and even higher up to ninety degrees centigrade are useful. At low temperature, solvents such as chloroform, methylene chloride, and particularly tetrahydrofuran are used. In the reaction of the epoxide with potassium bifluoride and an acid, organic acids are preferred such as acetic acid, propionic acid, formic acid or the like. However, other solvents such as neopentyl alcohol, isopropanol and the like with mineral acids such as sulfuric acid, perchloric acid or the like can be used. The reaction period is usually between fifteen minutes and four hours with reaction times of approximately two to three hours usually being sufficient for anhydrous hydrogen fluoride. When potassium bifluoride is used, reaction times of twelve hours to five days are employed. After the reaction is terminated the material is isolated by methods well known in the art such as neutralizing the excess of hydrogen fluoride present with a base for example sodium bicarbonate, potassium bicarbonate, sodium hydroxide or the like and extracting the product with water-immiscible solvents such as methylene chloride, chloroform, benzene, ether, hexanes and the like. Evaporation of the organic solvents used gives the crude material which is purified generally by recrystallization from organic solvents such as methanol, ethanol, acetone, Skellysolve B hexane, benzene, methylene chloride or the like, to give pure 5α,17α-dihydroxy-6β-fluoropregnane-3, 20-dione 17-acylate, 3-alkylene ketal. However, with aqueous hydrogen fluoride, the ketal group hydrolyzes yielding 5α,17α-dihydroxy-6β-fluoropregnane-3,20-dione.

The thus obtained 5α,17α-dihydroxy-6β-fluoropregnane-3,20-dione, 3-alkylene ketal 17-acylate is thereupon hydrolyzed in a water-miscible solvent, preferably in an aqueous alkanol or acetone acidic medium. As solvent alkanols, methanol and ethanol are the preferred alkanols, however, other suitable water-miscible solvents such as tertiary butyl alcohol, propyl alcohol, isopropyl alcohol, dioxane, acetone, acetic acid or the like can be used. To the solution of the steroid is then added an organic or inorganic acid, preferably a mineral acid such as sulfuric acid or hydrochloric acid; however, organic acids such as formic, acetic, propionic, and toluenesulfonic, can also be used. After standing the solution is neutralized with aqueous sodium bicarbonate, sodium carbonate, potassium carbonate, sodium hydroxide, or other alkali solutions, and concentrated to give a crude product consisting of 5α,17α-dihydroxy-6β-fluoropregnane-3,20-dione 17-acylate. The crude product can be purified using known techniques for example by recrystallization from organic solvents such as acetone, ethyl acetate, Skellysolve B hexanes, methanol, tertiary butyl alcohol, ether, or the like, or mixtures thereof to give pure 5α,17α-dihydroxy-6β-fluoropregnane-3,20-dione 17-acylate.

The thus obtained 5α,17α-dihydroxy-6β-fluoropregnane-3,20-dione 17-acylate is thereupon dehydrated. Dehydration can be effected in alkali solution or in acidic solution. In the preferred embodiment of the present invention acid dehydration is used. The steroid is dissolved or suspended in solvents unreactive to the acid employed, e. g. methylene chloride, chloroform, dioxane, and carbon tetrachloride and to the solution or suspension is added the selected acid. Acids particularly useful for this reaction are strong acids, e. g. gaseous hydrogen chloride or hydrogen bromide, sulfuric acid and the like, with gaseous hydrogen chloride preferred. For dehydration with alkali the steroid is dissolved in methanol, ethanol, dioxane, or other convenient solvents, unreactive to the base employed, the solution purged of oxygen by bubbling nitrogen through the solution, and allowed to react with an oxygen-free alkali metal base solution. Sodium or potassium hydroxide are the preferred bases, however, alkali metal alkoxides, barium hydroxide, calcium hydroxide, or the like, can be used.

Depending on the amount of acid or base used, the 6α and 6β-isomers are obtained. The dehydration produces at first the 6β-isomer which, being less stable in strong acid or bases, rearranges to the 6α-isomer. If, at the start of the dehydration reaction, the medium was strongly acidic only 6α-fluoro-17α-hydroxyprogesterone 17-acylate is obtained. A weakly acidic or basic medium furnishes the 6β-fluoro-17α-hydroxyprogesterone 17-acylate, while a strongly basic medium furnishes the free alcohol as α-epimer, i. e. 6α-fluoro-17α-hydroxyprogesterone. The 6β-isomer can subsequently be converted to the 6α-isomer by treatment with strong acid or base.

The thus obtained 6-fluoro-17α-hydroxyprogesterone 17-acylates or the free alcohol, 6-fluoro-17α-hydroxyprogesterone, obtained when more concentrated solution of strong base are used in the dehydration step, are isolated from the reaction mixture and purified by conventional procedures, such as by diluting with water and either recovering by filtration or by extracting the mixture with a water-immiscible solvent, methylene chloride, chloroform, hexanes, benzene, ether and the like, and evaporating the solvent. The thus obtained solids are purified by conventional procedures, such as recrystallization from organic solvent, such as methanol, ethanol, Skellysolve B hexanes, ethyl acetate, benzene or the like to obtain the pure 6-fluoro-17α-hydroxyprogesterone or the 17-acylate thereof respectively.

In the preferred embodiment of the instant invention 6-fluoro-17α-hydroxyprogesterone (VI) is prepared from 6-fluoro-17α-hydroxyprogesterone 17-acylate in a separate step by saponification. The saponification is preferably made at room temperature or in the cold rather than by refluxing in order to prevent rearrangement of the 17-carbon side chain or removal of hydrogen fluoride from the compound. For this purpose the 6-fluoro-17α-hydroxyprogesterone 17-acylate is allowed to react with an alkali metal hydroxide such as sodium hydroxide, potassium hydroxide or a carbonate such as sodium or potassium carbonate, bicarbonate or the like or with an alkali earth metal hydroxide such as barium or calcium hydroxide in alcoholic solution at room temperature for a reaction time of from one to 24 hours to obtain the 6-fluoro-17α-hydroxyprogesterone. In order to isolate the product from the reaction mixture the reaction mixture is first neutralized with aqueous acid such as aqueous acetic acid, aqueous hydrochloric or sulfuric acid and thereupon extracted with a water-immiscible organic solvent such as methylene chloride, chloroform, benzene, Skellysolve B hexanes, ether or the like and the extracts dried and evaporated to give the crude material. The crude material can then be recrystallized from organic solvents such as methanol, ethanol, acetone, Skellysolve B hexanes, ethyl acetate, methylene chloride or the like to give pure 6-fluoro-17α-hydroxyprogesterone. From the thus obtained 6-fluoro-17α-hydroxyprogesterone esters can be prepared by esterification carried out by methods well established in the art of esterifying tertiary hydroxyl groups in the 17α-position of steroids of the pregnane series, e. g., Huang-Minlon et al., J. Am. Chem. Soc. 74, 5394 (1952). Huang-Minlon et al. described both a "cold method" and a "hot method," both of which are equally useful in the esterification of 6α-fluoro-17α-hydroxyprogesterone. If in the esterification of the 6β-isomer, the β-isomers are desired, mild conditions are necessary (cold method, low amount of acid catalyst) since otherwise a conversion of the 6β-isomer to the 6α-isomer takes place. Details of the various methods are shown in the subsequent examples.

The following preparations and examples are illustrative of the products and the process of the present invention and are not to be construed as limiting.

PREPARATION 1

17α-hydroxyprogesterone acetate

One hundred grams (0.303 mole) of 17α-hydroxyprogesterone was dissolved in 1340 milliliters of acetic acid in a two liter round bottom flask equipped with stirrer, thermometer, and nitrogen inlet and outlet. Solution was accelerated by stirring and warming to about fifty degrees centigrade. The solution was cooled to eighteen to twenty degrees centigrade, and 340 milliliters of acetic anhydride added. The system was flushed with nitrogen, and forty grams of p-toluenesulfonic acid added with vigorous stirring and cooling to below about 22 degrees centigrade. The reaction mixture was allowed to stand for a period of two hours and then poured into six liters of ice water and was kept at zero to five degrees for a period of about thirteen to fifteen hours, whereupon the crude acetate was filtered off and washed several times with water. The product weighed 101 percent of theory and melted at 217 to 245 degrees centigrade. It was purified by recrystallization from methanol to yield 76 grams of the purified 17α-hydroxyprogesterone 17-acetate, of melting point 243 to 248 degrees centigrade and rotation $[\alpha]_D$ plus 69 degrees of chloroform.

PREPARATION 2

*17α-hydroxyprogesterone 17-(β-cyclopentylpropionate)*

One hundred grams (0.303 mole) of 17α-hydroxyprogesterone is dissolved in about 1400 milliliters of cyclopentylpropionic acid, and 410 milliliters of cyclopentylpropionic anhydride added, following the procedure of Preparation 1. As in Preparation 1, the vessel is is flushed with nitrogen, and forty grams of p-toluenesulfonic acid added with stirring and cooling. The reaction mixture is cooled as above, allowed to stand 4 hours, and then poured into ice water. Excess acid is washed from the product with three percent aqueous sodium hydroxide and then water, and the crude 17α-hydroxyprogesterone 17-(β-cyclopentylpropionate) purified by recrystallization from methanol to give pure 17α-hydroxyprogesterone 17-(β-cyclopentylpropionate) of melting point 128 to 131 degrees centigrade and rotation $[\alpha]_D$ plus 53.6 degrees in chloroform.

PREPARATION 3

*17α-hydroxyprogesterone 17-phenylacetate*

In the same manner as the above two preparations, 17α-hydroxyprogesterone 17-phenylacetate is prepared using a mixture of phenylacetic acid (500 grams) and phenylacetic anhydride (500 grams). One thousand milliliters of benzene is employed to provide a liquid reaction mixture. The product, 17α-hydroxyprogesterone 17-phenylacetate is recovered in good yield by adding water to the reaction mixture, separating the organic layer after it has stood for a period of about two hours, then washing the organic layer with water followed by an aqueous solution of sodium carbonate, followed again by a water wash and finally evaporating to dryness. The residual crude product is purified by recrystallization from methanol to give 17α-hydroxyprogesterone 17-phenylacetate.

PREPARATION 4

*17α-hydroxyprogesterone 17-formate*

To a solution containing one gram of 17α-hydroxyprogesterone, five milliliters of formic acid was added, then six drops of perchloric acid. The solution was covered with nitrogen and after standing for eighteen hours at room temperature the solution was diluted with water. The precepitate of 17α-hydroxyprogesterone formate was collected and recrystallized from acetone to give pure 17α-hydroxyprogesterone 17-formate of melting point 216 to 220 and rotation $[\alpha]_D$ of plus 86 degrees in chloroform.

*Analysis.*—Calcd. for $C_{22}H_{30}O_4$: C, 73.71; H, 8.44. Found: C, 73.46; H, 8.41.

PREPARATION 5

*17α-hydroxyprogesterone caproate*

Following the procedure of preparations 1 and 2, 17α-hydroxyprogesterone caproate is prepared using a mixture of caproic acid and caproic anhydride.

In a manner corresponding to that of the foregoing preparation 17α-hydroxyprogesterone phenylpropionate, 17α-hydroxyprogesterone 2-furoate, 17α-hydroxyprogesterone acrylate, 17α-hydroxyprogesterone valerate, 17α-hydroxyprogesterone trimethylacetate, 17α-hydroxyprogesterone t-butylacetate, 17α-hydroxyprogesterone cyclopentylcarboxylate, 17α-hydroxyprogesterone ethylbutyrate, 17α-hydroxyprogesterone cyclohexylacetate, 17α-hydroxyprogesterone O-toluate, 17α-hydroxyprogesterone monoglatarate, 17α-hydroxyprogesterone mono-diglycolate, 17α-hydroxyprogesterone mono-β-methylglutarate, 17α-hydroxyprogesterone mono-β,β-dimethylglutarate, 17α-hydroxyprogesterone formate, 17α-hydroxyprogesterone ethoxyacetate, 17α-hydroxyprogesterone laurate, 17α-hydroxyprogesterone butyrate, 17α-hydroxyprogesterone propionate, 17α-hydroxyprogesterone isovalerate, 17α-hydroxyprogesterone enanthate and 17α-hydroxyprogesterone caprylate are prepared by dissolving 17α-hydroxyprogesterone in a solution comprising a mixture of the appropriate acid and its anhydride together with p-toluenesulfonic acid. The crude ester is isolated in accordance with the procedure of the foregoing preparations, if necessary subjected to a selective hydrolysis of the enol ester group, and recrystallized to give the 17α-hydroxyprogesterone ester. If the corresponding acid or its anhydride is solid, an inert solvent such as benzene, chloroform or dioxane can be added to effect solution and to provide a liquid esterification reaction medium.

PREPARATION 6

*17α-hydroxyprogesterone 17-acetate, 3-ethylene ketal*

A solution was prepared containing ten grams of 17α-hydroxyprogesterone 17-acetate in fifty milliliters of chloroform. Thereto was added 100 milliliters of ethylene glycol containing 500 milligrams of paratoluenesulfonic acid monohydrate. The mixture was concentrated with stirring at atmospheric pressure under nitrogen until the temperature reached about 75 degrees centigrade. The pressure was then reduced to remove the last traces of chloroform. Forty-eight milliliters of distillate was collected over one half hour as the product precipitated. The mixture was then cooled with stirring, one milliliter of pyridine was added followed by 200 milliliters of five percent aqueous sodium carbonate solution. The mixture was filtered and the product washed with sodium carbonate. The moist filter cake was taken up in methylene chloride. The organic layer was removed, washed with water, dried over anhydrous magnesium sulfate, and evaporated to give a white crystalline cake containing 10.9 grams of crude 17α-hydroxyprogesterone 17-acetate, 3-ethylene ketal of melting point 240 to 244 degrees centigrade and rotation $[\alpha]_D$ minus 39 degrees in chloroform.

*Analysis.*—Calcd. for $C_{25}H_{36}O_5$: C, 72.08; H, 8.71. Found: C, 71.56; H, 8.47.

PREPARATION 7

*17α-hydroxyprogesterone 17-phenylacetate, 3-ethylene ketal*

A solution was prepared containing five grams of 17α-hydroxyprogesterone 17-phenylacetate in 100 milliliters of benzene, ten milliliters of ethylene glycol and 0.25 gram of para-toluenesulfonic acid monohydrate. This mixture was refluxed for a period of seventeen hours using a calcium carbide water trap to remove the water formed in the reaction. After this period of reflux one milliliter of pyridine was added to the solution, and the mixture cooled to room temperature. The lower glycol layer was separated and washed with benzene. The benzene layer and the washings with benzene were combined, washed with five percent sodium carbonate solution, water and saturated sodium chloride solution. After being dried over anhydrous magnesium sulfate, the solution was concentrated to dryness at reduced pressure. The residue was recrystallized twice from hot methylene chloride, and once from acetone to give pure 17α-hydroxyprogesterone 17-phenylacetate, 3-ethylene ketal.

PREPARATION 8

*17α-hydroxyprogesterone 17-acetate, 3-propylene ketal*

In the same manner given in Preparation 7, 17α-hydroxyprogesterone 17-acetate, dissolved in benzene and propylene glycol, was heated to reflux in the presence of paratoluenesulfonic acid for a period of eighteen hours to give 17α-hydroxyprogesterone acetate, 3-propylene ketal.

PREPARATION 9

*17-hydroxyprogesterone 17-(β-cyclopentylpropionate), 3-(1,3-propylene ketal)*

In the same manner given in Preparation 7, 17α-hydroxyprogesterone 17-(β-cyclopentylpropionate), dissolved in chloroform and propylene-1,3-diol, was heated to reflux in the presence of para-toluenesulfonic acid for a period of 24 hours to give 17α-hydroxyprogesterone 17-(β-cyclopentylpropionate), 3-(1,3-propylene ketal).

In the same manner as shown in Preparation 6 through 9, other 17α-hydroxyprogesterone 17-acylate, 3-alkylene ketals are prepared by reacting at reflux temperature solutions of 17α-hydroxyprogesterone acylates in benzene, toluene, hexane, heptane, or other inert organic solvents with 1,2-alkane diols or 1,3-alkane diols such as butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

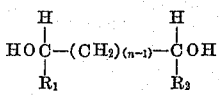

wherein $n$ is an integer having a value from one to two, inclusive, and $R_1$ and $R_2$ are selected from the group consisting of hydrogen and lower alkyl radicals containing up to six carbon atoms and wherein the total number of carbon atoms in the alkane diol is up to and including eight carbon atoms, in the presence of a strong acid such as toluenesulfonic acid, ortho-chlorobenzenesulfonic acid, sulfuric acid, and the like, to obtain the corresponding 17α-hydroxyprogesterone 17-acylate, 3-alkylene ketal. Representative 17α-hydroxyprogesterone 17-acylate, 3-alkylene ketals include the 17α-hydroxyprogesterone 17-caproate, 3,20-bis-(1,3-propylene ketal); 17α-hydroxyprogesterone-17-hemisuccinate 1,2- and 1,3-butylene diketal, 17α-hydroxyprogesterone 17-propionate 1,2-, 1,3- and 2,3-pentylene diketal; 17α-hydroxyprogesterone 17-phenylpropionate, 3-ethylene ketal; 17α-hydroxyprogesterone 17-butyrate and 17-valerate, 3-ethylene ketals; 17α-hydroxyprogesterone 17-benzoate, 3-propylene ketal; 17α-hydroxyprogesterone 17-hexanoate and cyclohexylformate, 3-ethylene ketals; 17α-hydroxyprogesterone 17-laurate, 3-ethylene and 3-propylene ketals and the like.

EXAMPLE 1

*5α,6α-oxido-17α-hydroxypregnane-3,20-dione 17-acetate, 3-ethylene ketal*

A solution of 17α-hydroxyprogesterone 17-acetate, 3-ethylene ketal, dissolved in 230 milliliters of benzene, was treated with stirring at six degrees to eight degrees centigrade, with 42 milliliters of cold forty percent peracetic acid containing 4.2 grams of sodium acetate. The mixture was allowed to stir overnight at room temperature, the layers were then separated, the peracetic acid layer after dilution with water was extracted with benzene three times and the combined benzene layers were washed with cold dilute sodium hydroxide water and thereupon dried over anhydrous sodium sulfate. The dried benzene solution was then evaporated to dryness and the thus obtained residue recrystallized once from methylene chloride-ether and then from ethyl acetate to give 2.7 grams of the α-epoxide, 5α,6α-oxido-17α-hydroxypregnane-3,20-dione 17α-acetate, 3-ethylene ketal of melting point 224 to 228 degrees centigrade and rotation $[\alpha]_D$ minus 63 degrees in chloroform.

*Analysis.*—Calcd. for $C_{25}H_{38}O_6$: C, 69.41; H, 8.40. Found: C, 69.46; H, 8.81.

EXAMPLE 2

*5α,6α-oxido-17α-hydroxypregnane-3,20-dione 17-phenylacetate, 3-ethylene ketal*

A solution was prepared by heating five grams of 17α-hydroxyprogesterone 17-phenylpropionate, 3-ethylene ketal and 125 milliliters of benzene. After the solution was effected the flask was cooled to five degrees centigrade and a mixture of one gram of sodium acetate and 25 milliliters of peracetic acid solution (40 percent) was added with stirring. The reaction mixture was stirred in the ice bath for five hours. The lower peracid layer was separated, diluted with water and extracted twice with benzene. The upper layer was neutralized by the addition of cold ten percent sodium hydroxide solution while stirring in an ice bath. The rate of addition of the sodium hydroxide was regulated to keep the temperature below ten degrees centigrade. The upper layer was then extracted with benzene and the combined benzene extracts washed with cold ten percent sodium hydroxide solution and then with saturated sodium chloride solution. All the aqueous layers were washed again with the same portion of benzene. The combined benzene layers were dried over anhydrous magnesium sulfate and concentrated to dryness at reduced pressure. The residue was recrystallized from acetone and methylene chloride and then from ethylacetate to give 5α,6α-oxido-17α-hydroxypregnane-3,20-dione 17-phenylpropionate, 3-ethylene ketal.

EXAMPLE 3

*5α,6α-oxido-17α-hydroxypregnane-3,20-dione 17-acetate, 3-propylene ketal*

In the same manner given in Example 1, reacting 17α-hydroxyprogesterone 17-acetate, 3-propylene ketal with peracetic acid and anhydrous sodium acetate in chloroform solution produced 5α,6α-oxido-17α-hydroxypregnane-3,20-dione 17-acetate, 3-propylene ketal.

EXAMPLE 4

*5α,6α-oxido-17α-hydroxypregnane-3,20-dione 17-(β-cyclopentylpropionate), 3-(1,3-propylene ketal)*

In the same manner given in Example 1 reacting 17α-hydroxyprogesterone 17-(β-cyclopentylpropionate), 3-(1,3-propylene ketal) with peracetic acid and anhydrous sodium acetate in chloroform solution produces 5α,6α-oxido-17α-hydroxyprogesterone 3,20-dione 17-(β-cyclopentylpropionate), 3-(1,3-propylene ketal).

In the same manner as shown in Examples 1 through 4, other 5α,6α-oxido-17α-hydroxypregnane-3,20-dione 17-acylates, 3-ketals are prepared by reacting the corresponding 17α-hydroxyprogesterone 17-acylate ketal with a peracid, such as performic, peracetic, perpropionic, perbenzoic, monoperphthalic acid, at low temperatures usually between minus ten and plus ten degrees centigrade. Representative compounds thus prepared comprise: 5α,6α-oxido-17α-hydroxypregnane-3,20-dione, 17-caproate 3-(1,3-propylene ketal); 5α,6α-oxido-17α-hydroxypregnane-3,20-dione formate, 3-(1,2-butylene ketal); (2,3- and 1,3-butylene ketal); 5α,6α-oxido-17α-hydroxypregnane-3,20-dione 17-propionate, 1,2-, 2,3-, 2,4- and 1,3-pentylene ketals; 5α,6α-oxido-17α,hydroxypregnane-3,20-dione 17-phenylpropionate, 3-ethylene ketal; 5α,6α-oxido-17α-hydroxypregnane-3,20-dione 17-butyrate and 17-valerate, 3-ethylene ketal; 5α,6α-oxido-17α-hydroxypregnane-3,20-dione 17-benzoate, 3-propylene ketal; 5α,6α-oxido-17α- hydroxypregnane-3,20-dione 17-hexanoate and cyclohexaneformate, 3-ethylene ketals; 5α,6α-oxido-17α-hydroxypregnane-3,20-dione 17-laurate, 3-ethylene and 3-propylene ketals and the like.

EXAMPLE 5

*5α,17α-dihydroxy 6β-fluoropregnane-3,20-dione 17-acetate, 3-ethylene ketal*

A solution of one gram of 5α,6α-oxido-17α-hydroxypregnane-3,20-dione 17-acetate, 3-ethylene ketal in seven milliliters of acetic acid and one-half milliliter of acetic anhydride was stirred with 2.1 grams of powdered potassium bifluoride at room temperature for a period of two days. Thereafter the reaction mixture was diluted with fifty milliliters of methylene chloride and the methylene chloride solution washed three times with fifty milliliters of water. The methylene chloride solution was then dried over anhydrous sodium sulfate, evaporated to dryness to give crude 5α,17α-dihydroxy-6β-fluoropregnane-3,20-dione 17-acetate, 3-ethylene ketal.

EXAMPLE 6

*5α,17α-dihydroxy-6β-fluoropregnane-3,20-dione 17-phenylacetate, 3-ethylene ketal*

A solution of 400 milligrams of 5α,6α-oxido-17α-hydroxypregnane-3,20-dione 17-phenylacetate, 3-ethylene ketal in five milliliters of alcohol-free chloroform was cooled to minus fifteen degrees centigrade. To the cooled solution was added 2.5 milliliters of an ice cold solution of about 100 milligrams of anhydrous hydrogen fluoride in five milliliters of alcohol-free chloroform. The reaction mixture was stored at minus fifteen degrees centigrade for four hours with occasional stirring. The solution was then washed at about zero degrees centigrade with aqueous sodium bicarbonate and then with water. The washed chloroform solution was dried and then distilled to dryness, leaving a residue of 5α,17α-dihydroxy-6β-fluoropregnane-3,20-dione 17-phenylacetate, 3-ethylene ketal.

EXAMPLE 7

*5α,17α-dihydroxy-6β-fluoropregnane-3,20-dione 17-acetate, 3-propylene ketal*

In a fifty milliliter polyethylene bottle, cooled with Dry Ice-acetone, was placed 3.5 grams of anhydrous hydrogen fluoride, followed slowly with 2.5 milliliters of chilled chloroform and seven milliliters of tetrahydrofuran. To this solution was added two grams of 5α,6α-oxido-17α-hydroxypregnane-3,20-dione 17-acetate, 3-propylene ketal. The violet solution was then kept for two hours at minus ten degrees centigrade and then poured into excess aqueous sodium bicarbonate. The product was extracted from the aqueous mixture with three 25-milliliter portions of methylene chloride, the methylene chloride extracts combined, washed three times with water, evaporated to dryness and the thus obtained material twice recrystallized from ethylene chloride and ethyl acetate to give 5α, 17α-dihydroxy-6β-fluoropregnane-3,20-dione 17-acetate, 3-propylene ketal.

EXAMPLE 8

*5α,17α-dihydroxy - 6β - fluoropregnane-3,20-dione 17-(β-cyclopentylpropionate), 3-(1,3-propylene ketal)*

In the same manner given in Example 5 reacting 5α,6α-oxido-17α-hydroxypregnane- 3,20 -dione 17-(β-cyclopentylpropionate), 3-(1,3-propylene ketal) with potassium bifluoride in acetic acid yields 5α,17α-dihydroxy-6β-fluoropregnane-3,20-dione 17 - (β - cyclopentylpropionate), 3-(1,3-propylene ketal).

In the same manner as shown in Examples 5 through 8, inclusive, treating other 5α,6α-oxido-17α-hydroxypregnane 3,20-dione 17-acylates 3-alkylene ketals with hydrogen fluoride, either in the free state or produced in situ, results in the corresponding 5α,17α,dihydroxy-6β-fluoropregnane-3,20-dione 17-acylate, 3-alkylene ketal. Representative compounds thus prepared comprise 5α,17α-dihydroxy-6β-fluoro-3,20-dione 17-caproate 3-(1,3-propylene ketal); 5α,17α-dihydroxy-6β-fluoropregnane-3,20-dione 17-formate, 3-(1,2-, 2,3- and 1,3-butylene ketals); 5α,17α-dihydroxy- 6β -fluoropregnane-3,20-dione 17-propionate, 1,2-, 2,3-, 2,4- and 1,3-pentylene ketals; 5α,17α-dihydroxy-6β-fluoropregnane-3,20-dione 17-phenylpropionate, 3-ethylene ketals; 5α,17α-dihydroxy-6β-fluoropregnane-3,20-dione 17-butyrate and 17-valerate, 3-ethylene ketals; 5α,17α-dihydroxy-6β-fluoropregnane-3,20-dione 17-benzoate, 3-propylene ketal; 5α,17α-dihydroxy-6β-fluoropregnane-3,20-dione 17-hexanoate and cyclohexylformate, 3-ethylene ketals; 5α,17α-dihydroxy-6β-fluoropregnane-3,20-dione 17-laurate, 3-ethylene and 3-propylene ketals and the like.

EXAMPLE 9

*5α,17α-dihydroxy-6β-fluoropregnane-3,20-dione 17-acetate*

The crude 5α,17α-dihydroxy-6β-fluoropregnane-3,20-dione 17-acetate, 3-ethylene ketal of Example 5 was dissolved in twenty milliliters of 95 percent ethanol and thereto was added 0.5 milliliter of one normal sulfuric acid. The mixture was warmed for a period of twenty minutes then diluted with 100 milliliters of water and the precipitated material collected and filtered. The thus produce 5α,17α-dihydroxy-6β-fluoropregnane-3,20-dione 17-acetate was recrystallized from ethanol and had a melting point of 260 to 262 degrees centigrade.

EXAMPLE 10

*5α,17α-dihydroxy-6β-fluoropregnane-3,20-dione 17-phenylacetate*

A solution was prepared containing ten grams of 5α,-17α-dihydroxy-6β-fluoropregnane - 3,20 - dione 17-phenylacetate, 3-ethylene ketal in 100 milliliters of boiling acetone. Thereto was added ten milliliters of one normal sulfuric acid in portions under swirling and seeding with product. Boiling was continued for a period of two minutes and the mixture was allowed to stand at room temperature. Thereafter the mixture was diluted with 400 milliliters of water, chilled and filtered. The precipitate was washed with water, dilute ammonium hydroxide and water, dried in a vacuum oven overnight, and then twice recrystallized from acetone to give 5α,17α-dihydroxy-6β-fluoropregnane-3,20-dione 17-phenylacetate.

EXAMPLE 11

In the same manner given in Example 9 hydrolyzing with dilute sulfuric acid in ethanol:

(*a*) 5α,17α-dihydroxy-6β-fluoropregnane-3,20-dione 17-acetate, 3-propylene ketal gives 5α,17α-dihydroxy-6β-fluoropregnane-3,20-dione 17-acetate.

(*b*) 5α,17α-dihydroxy-6β-fluoropregnane-3,20-dione 17-(β-cyclopentylpropionate), 3-(1,3-propylene ketal) gives 5α,17α-dihydroxy-6β-fluoropregnane-3,20-dione 17-(β-cyclopentylpropionate).

(*c*) 5α,17α-dihydroxy-6β-fluoropregnane-3,20-dione 17-caproate, 3-(1,3-propylene ketal) gives 5α,17α-dihydroxy-6β-fluoropregnane-3,20-dione 17-caproate.

(*d*) 5α,17α-dihydroxy-6β-fluoropregnane-3,20-dione 17-formate, 3-(1,2-butylene ketal) gives 5α,17α-dihydroxy-6β-fluoropregnane-3,20-dione 17-formate.

(*e*) 5α,17α-dihydroxy-6β-fluoropregnane-3,20-dione 17-propionate, 3-pentylene ketal gives 5α,17α-dihydroxy-6β-fluoropregnane-3,20-dione 17-propionate.

(*f*) 5α,17α-dihydroxy-6β-fluoropregnane-3,20-dione 17-phenylpropionate, 3-ethylene ketal gives 5α,17α-dihydroxy-6β-fluoropregnane-3,20-dione 17-phenylpropionate.

(*g*) 5α,17α-dihydroxy-6β-fluoropregnane-3,20-dione 17- butyrate, 3-ethylene ketal gives 5α,17α-dihydroxy-6β-fluoropregnane-3,20-dione 17-butyrate.

(h) 5α,17α-dihydroxy-6β-fluoropregnane-3,20-dione 17-valerate, 3-ethylene ketal gives 5α,17α-dihydroxy-6β-fluoropregnane-3,20-dione 17-valerate.

(i) 5α,17α-dihydroxy-6β-fluoropregnane-3,20-dione 17-benzoate, 3-propylene ketal gives 5α,17α-dihydroxy-6β-fluoropregnane-3,20-dione 17-benzoate.

EXAMPLE 12

6α-fluoro-17α-hydroxyprogesterone 17-acetate

A solution of 87 milligrams of 5α,17α-dihydroxy-6β-fluoropregnane-3,20-dione 17-acetate, dissolved in five milliliters of chloroform, was cooled in an ice salt bath. This solution was saturated with hydrogen chloride gas for a period of thirty minutes. Thereafter the mixture was washed with three twenty-milliliter portions of water to render the solution neutral. Thereafter the solution was dried over anhydrous magnesium sulfate, and evaporated to dryness to give a crystalline material which was recrystallized from ethyl acetate to give 6α-fluoro-17α-hydroxyprogesterone 17-acetate of melting point 253 to 256 degrees centigrade and rotation $[\alpha]_D$ plus 66 degrees in chloroform. $\lambda_{max.}^{alc.}$ 235 mμ, $A_m$=15,575.

Analysis.—Calcd. for $C_{23}H_{31}FO_3$: F, 5.07. Found: F, 5.23.

EXAMPLE 13

6α-fluoro-17α-hydroxyprogesterone 17-phenylacetate

In the same manner given in Example 12, dehydrating 5α,17α-dihydroxy-6β-fluoropregnane-3,20-dione 17-phenylpropionate resulted in 6α-fluoropregnane-3,20-dione 17-phenylacetate.

EXAMPLE 14

6α-fluoro-17α-hydroxyprogesterone 17-(β-cyclopentylpropionate

In the same manner given in Example 12 5α,17α-dihydroxy-6β-fluoropregnane-3,20-dione 17-(β-cyclopentylpropionate) is dehydrated with gaseous hydrogen to give 6α-fluoro-17α-progesterone 17-(β-cyclopentylpropionate).

In the same manner given in Example 12 dehydrating with a strong mineral acid such as hydrogen fluoride, sulfuric acid or the like other 5α,17α-dihydroxy-6β-fluoropregnane-3,20-dione 17-acylates produces the corresponding 6α - fluoro - 17α - hydroxyprogesterone 17α-acylates. Representative compounds thus produced comprise the 6α-fluoro-17α-hydroxyprogesterone caproate, propionate, formate, butyrate, isobutyrate, valerate, hexanoate, benzoate, phenylpropionate, formate, trimethylacetate, octanoate, decanoate, laurate, undecylenate, acrylate, crotonate, hemisuccinate, glutarate, β,β-dimethylglutarate, cyclohexylformate, cyclopentylacetate, and the like.

EXAMPLE 15

6β-fluoro-17α-hydroxyprogesterone 17-acetate

To a solution of 200 milligrams of 5α,17α-dihydroxy-6β-fluoropregnane-3,20-dione 17-acetate in forty milliliters of 95 percent ethanol was added two milliliters of 0.1 normal sodium hydroxide solution. The mixture was kept for four hours at a temperature of about 35 degrees centigrade and thereupon neutralized with a few drops of acetic acid and poured into 100 milliliters of ice water. The precipitated crude 6β-fluoro-17α-hydroxyprogesterone 17-acetate was recrystallized twice from ethyl acetate-Skellysolve B hexane to give pure 6β-fluoro-17α-hydroxyprogesterone 17-acetate of melting point 196 to 199 degrees centigrate and rotation $[\alpha]_D$ minus 19 degrees (chloroform).

In the same manner given in Example 15, treating other 5α,17α-dihydroxy-6β-fluoropregnane-3,20-dione 17-acylates with dilute alkali or dilute acids under mild conditions produces the corresponding 6β-fluoro-17α-hydroxyprogesterone acylates. In this manner are produced the following representative compounds: 6β-fluoro-17α-hydroxyprogesterone 17-caproate, formate, propionate, isobutyrate, valerate, octanoate, decanoate, laurate, undecylenate, acrylate, crotonate, benzoate, phenylpropionate, phenylacetate, trimethylacetate, β-cyclopentylpropionate, hemisuccinate, β,β-dimethylglutarate and the like.

EXAMPLE 16

6α-fluoro-17α-progesterone 17-acetate from 6β-fluoro-17α-hydroxyprogesterone 17-acetate A solution of 6β-fluoro-17α-hydroxyprogesterone 17-acetate was heated for thirty minutes in a solution of ethanol saturated with hydrogen chloride. After thirty minutes the mixture was poured into a large excess of water and the precipitated material collected and filtered, and recrystallized to give 6α-fluoro-17α-hydroxyprogesterone 17-acetate.

EXAMPLE 17

6α-fluoro-17α-hydroxyprogesterone

A solution of a 6α-fluoro-17α-hydroxyprogesterone 17-acetate (200 milligrams) in four milliliters of 95 percent ethanol and 0.5 milliliter of water containing 100 milligrams of potassium hydroxide was allowed to stand at room temperature approximately 25 degrees centigrade. Thereafter the mixture was neutralized by the addition of sufficient acetic acid and poured into fifty milliliters of ice water. The ice water solution was extracted with three ten-milliliter portions of methylene chloride. The methylene chloride solutions were combined, washed with water, dried over anhydrous sodium sulfate and evaporated. The thus obtained residue was recrystallized three times from methanol to give 6α-fluoro-17α-hydroxyprogesterone.

In the same manner as shown in example 17 other 6α-fluoro-17α-hydroxyprogesterone 17-acylates can be hydrolyzed at room temperature with a base such as sodium or potassium hydroxide, sodium or potassium carbonate or the like to give 6α-fluoro-17α-hydroxyprogesterone.

The thus obtained free 6α-fluoro-17α-hydroxyprogesterone can be esterified as shown in examples 18 through 20.

EXAMPLE 18

6α-fluoro-17α-hydroxyprogesterone 17-acetate

One gram of 6α-fluoro-17α-hydroxyprogesterone was dissolved in a mixture of ten milliliters of acetic acid and two milliliters of acetic anhydride by heating. After this solution was effected, the mixture was cooled to fifteen degrees centigrade, and 0.3 gram of paratoluenesulfonic acid was added. After allowing the mixture to stand for a period of two and one half hours at room temperature, the pink solution was poured into ice water to give an amorphous solid which was recovered by filtration. The precipitate was washed carefully with water and was then dissolved in ten milliliters of methanol and 1.5 milliliters of methylene chloride. The solution was concentrated to ten milliliters, diluted with 0.5 milliliter of ten percent sodium hydroxide, boiled for one minute and cooled to hydrolyze any enol acylates present. The product was thereupon recrystallized to give flakes of 6α-fluoro-17α-hydroxyprogesterone 17-acetate.

EXAMPLE 19

6α-fluoro-17α-hydroxyprogesterone 17-phenylpropionate

One gram of 6α-fluoro-17α-hydroxyprogesterone and one gram of isopropenyl phenylpropionate were refluxed in fifty milliliters of benzene for a period of six hours. The resulting mixture was poured into ice water and the solids collected on filter paper. The solids were redissolved in fifteen milliliters of methanol containing 0.5 milliliter of water and about fifty milligrams of sodium hydroxide. This mixture was heated on the water bath for ten minutes and thereupon allowed to evaporated. The thus obtained solids were redissolved in methanol and acetone and recrystallized twice from methanol and acetone to give pure 6α-fluoro-17α-hydroxyprogesterone 17-phenylpropionate.

EXAMPLE 20

*6α - fluoro - 17α - hydroxyprogesterone 17-(β-cyclopentyl-propionate)*

A mixture of one gram of 6α-fluoro-17α-hydroxyprogesterone four milliliters of β-cyclopentylpropionic acid is heated to eighty degrees centigrade in the presence of one milliliter of trifluoroacetic anhydride for a period of 45 minutes. The mixture is then poured into excess of water, neutralized by the addition of sodium carbonate and the thus formed oily material extracted with ether. The ether solution is washed, dried over anhydrous magnesium sulfate and evaporated. The thus-obtained residue is purified by crystallization from methanol to give 6α-fluoro-17α-hydroxyprogesterone 17-(β-cyclopentylpropionate).

EXAMPLE 21

*6α-fluoro-17α-hydroxyprogesterone 3-acetate from 17α-hydroxypregnenolone 3-acetate*

A solution of twenty grams of 17α-hydroxypregnenolone-17-acetate, prepared by acetylation of 17α-hydroxypregnenolone with acetic anhydride in the presence of toluenesulfonic acid and mild hydrolysis at room temperature with sodium hydroxide, and 400 milliliters of chloroform containing four grams of anhydrous sodium acetate and twenty milliliters of 40 percent peracetic acid was stirred between zero and five degrees centigrade for two hours. The reaction mixture was washed with water and aqueous sodium bicarbonate, evaporated to dryness and the thus obtained residue crystallized from ethylene chloride to give 3β,17α-dihydroxy-5α,6α-oxido-pregnan-20-one 17-acetate.

6.9 grams of anhydrous hydrogen fluoride, two and one-half milliliters of chloroform and seven milliliters of tetrahydrofuran were chilled in a polyethylene bottle. To this was added two grams of 3β,17α-dihydroxy-5α,6α-oxido-pregnan-20-one 17-acetate in twelve milliliters of cold chloroform. The solution was kept for two hours at minus ten degrees centigrade then poured into excess aqueous sodium bicarbonate with stirring. The product was extracted with methylene chloride, washed with water, evaporated to dryness and recrystallized from methylene chloride-ethyl acetate to give about one and one-half grams of 3β,5α,17α-trihydroxy - 6β - fluoroprengnan-20-one 17-acetate.

One gram of 3β,5α,17α-trihydroxy-6β-fluoropregnan-20-one 17-acetate was added to 25 milliliters of acetic acid and thereto was immediately added with swirling in a cold water bath, one gram of sodium dichromate dihydrate, dissolved in 7.5 milliliters of acetic acid. After standing overnight two milliliters of methanol was added and the mixture quenched with 300 milliliters of water and filtered. The material thus obtained was recrystallized from ethanol to give 5α,17α-dihydroxy-6β-fluoropregnane 3,20-dione 17-acetate. The thus-obtained 5α,17α-dihydroxy - 6β - fluoropregnane - 3,20 - dione 17-acetate can be converted to 6α-fluoro - 17α - hydroxyprogesterone 17-acetate by treating with a strong acid solution as shown in Example 12.

Other 17-acylates of 6α-fluoro-17α-hydroxyprogesterone can be obtained either by esterification as shown in Examples 18 through 20 or by carrying out the before shown synthesis using however, instead of 17α-hydroxypregnenolone a selected 17-acylate thereof.

17α-acylates produced by esterification as illustrated by Examples 18 through 20 of 6α-fluoro- or 6β-fluoro-17α-hydroxyprogesterone include: the 17-propionate, butyrate, isobutyrate, valerate, isovalerate, hexanoate, heptanoate, octanoate, decanoate, undecanoate, laurate, acrylate, crotonate, chrysanthemummono-carboxylate, undecylenate, cinnamate, propiolate, 2-butynoate, 3-butynoate, hexenynoates such as cis and trans hex-4(5)-en-2(3)-ynoate, cis and trans hex-2(3)-en-4(5)-ynoic and hexa-2,4-diynoic acid benzoate, phenylpropionate, and the like.

If in preparation of 6, 17α-hydroxyprogesterone is ketalized instead of the 17α-acylate thereof, the 3,20-diketal is obtained, which by epoxidation as shown in Example 1, will produce the corresponding 5α,6α-oxido-17α,-hydroxypregnane-3,20-dione 3,20-bis-(alkylene ketal). When 5α,6α-oxido-17α-hydroxypregnane-3,20 - dione 3,20 - bis-(alkylene ketal) is treated with hydrogen fluoride, as shown in Example 5, the corresponding 5α,17α-dihydroxy-6β-fluoropregnane-3,20-dione 3,20-bis-(alkylene ketal) is obtained which can be hydrolyzed as shown in Example 9 to give the corresponding 5α,17α-dihydroxy-6β-fluoropregnane-3,20-dione and dehydrated to give 6-fluoro-17α-hydroxyprogesterone by the process as shown in Example 11.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 6-fluoro-17α-hydroxyprogesterone.
2. 6β-fluoro-17α-hydroxyprogesterone.
3. 6α-fluoro-17α-hydroxyprogesterone.
4. 6-fluoro-17α-hydroxyprogesterone 17-acylate, wherein the acyl group is of a hydrocarbon carboxylic acid containing from one to twelve carbon atoms, inclusive.
5. Lower fatty acid esters of 6-fluoro-17α-hydroxyprogesterone.
6. 6α-fluoro-17α-hydroxyprogesterone 17-acetate.
7. 6β-fluoro-17α-hydroxyprogesterone 17-acetate.
8. A 5,6-oxido-17α-hydroxypregnane-3,20-dione 17-acylate, 3-alkylene ketal wherein the acyl group is of a hydrocarbon carboxylic acid containing from one to twelve carbon atoms and wherein the alkylene radical contains not more than eight carbon atoms, inclusive, and the attaching oxygen to carbon bonds are separated by a chain of at least two and not more than three carbon atoms.
9. 5α,6α-oxido-17-hydroxypregnane-3,20-dione 17-acetate 3-ethylene ketal.
10. 5α,17α-dihydroxy-6β - fluoropregnane - 3,20 - dione 17-acylate, 3-alkylene ketal wherein the acyl group is of a hydrocarbon carboxylic acid containing from one to twelve carbon atoms and wherein the alkylene radical contains not more than eight carbon atoms, inclusive, and the attaching oxygen to carbon bonds are separated by a chain of at least two and not more than three carbon atoms.
11. 5α,17α-dihydroxy-6β - fluoropregnane - 3,20 - dione 17-acetate, 3-ethylene ketal.
12. 5α,17α-dihydroxy-6β - fluoropregnane - 3,20 - dione 17-acylate wherein the acyl group is of a hydrocarbon carboxylic acid containing from one to twelve carbon atoms, inclusive.
13. 5α,17α-dihydroxy-6β - fluoropregnane - 3,20 - dione 17-acetate.
14. A process for the production of 6-fluoro-17α-hydroxyprogesterone 17-acylate which comprises: dehydrating a 5α,17α-dihydroxy-6β-fluoropregnane-3,20-dione 17-acylate with a compound selected from strong acids and alkali metal hydroxides to obtain 6-fluoro-17α- hydroxyprogesterone 17-acylate.
15. A process for the production of 6α-fluoro-17α-hydroxyprogesterone 17-acetate which comprises: dehydrating 5α,17α-dihydroxy-6β-fluoropregnane-3,20-dione 17-acetate with a strong mineral acid to obtain 6α-fluoro-17α-hydroxyprogesterone 17-acylate.

16. A process for the production of 6α-fluoro-17α-hydroxyprogesterone 17-acetate which comprises: dehydrating 5α,17α-dihydroxy-6β-fluoropregnane-3,20-dione 17-acetate with dilute alkali at a temperature between zero and forty degrees centigrade to obtain 6β-fluoro-17α-hydroxyprogesterone 17-acetate, and isomerizing the thus obtained 6β-fluoro-17α-hydroxyprogesterone 17-acetate with a strong mineral acid to obtain 6α-fluoro-17α-hydroxyprogesterone 17-acetate.

17. A process for the production of 6-fluoro-17α-hydroxyprogesterone 17-acylate which comprises: treating 6-fluoro-17α-hydroxyprogesterone with an acylating agent selected from acid anhydrides and isopropenyl acylates of hydrocarbon carboxylic acids wherein the acyl radicals of the hydrocarbon carboxylic acid contain from one to twelve carbon atoms, inclusive, to obtain the corresponding 6-fluoro-17α-hydroxyprogesterone 17-acylate.

18. A process for the production of 6α-fluoro-17α-hydroxyprogesterone 17-acetate which comprises: esterifying 6α-fluoro-17α-hydroxyprogesterone with acetic anhydride in the presence of an acid catalyst to obtain 6α-fluoro-17α-hydroxyprogesterone 17-acetate.

No references cited.

Disclaimer

2,838,496.—*John C. Babcock*, Portage Township, Kalamazoo County, and *J Allan Campbell* and *John A. Hogg*, Kalamazoo Township, Kalamazoo County, Mich. 6-FLUORO STEROIDS AND PROCESS FOR PREPARING SAME. Patent dated June 10, 1958. Disclaimer filed May 20, 1965, by the inventors; the assignee, *The Upjohn Company*, assenting.

Hereby enter this disclaimer to claims 4, 5, 6, 7, 8, 9, 10, 11, 12, 13, 14, 15 and 16 of said patent.

[*Official Gazette August 24, 1965.*]